Feb. 6, 1962 W. H. SENS 3,019,601
PEN-SHAPED NOZZLE WITH THRUST DEFLECTOR
Filed Oct. 5, 1959
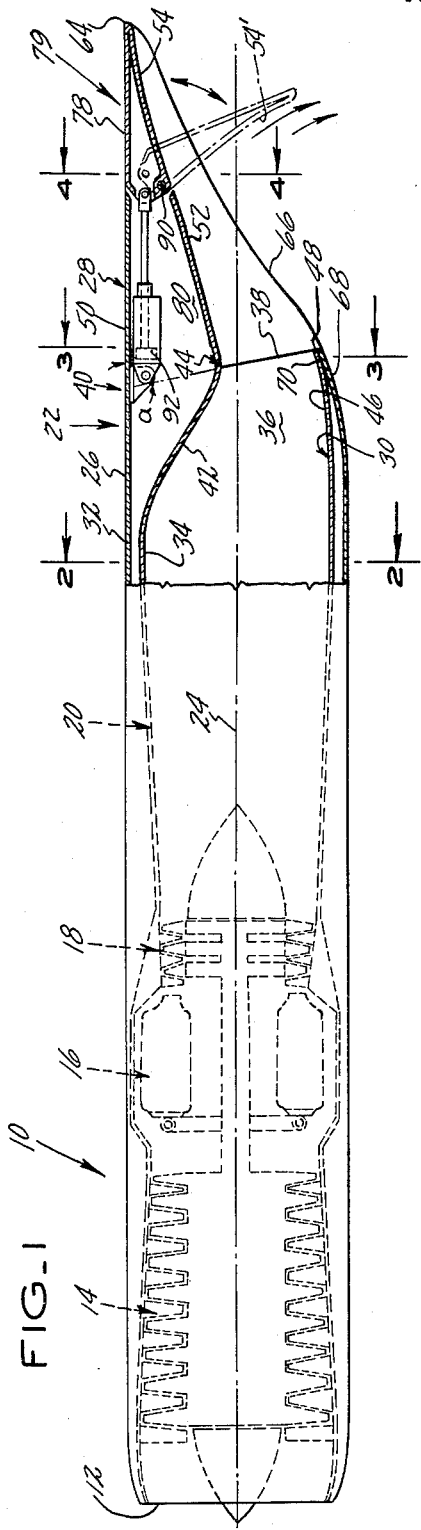
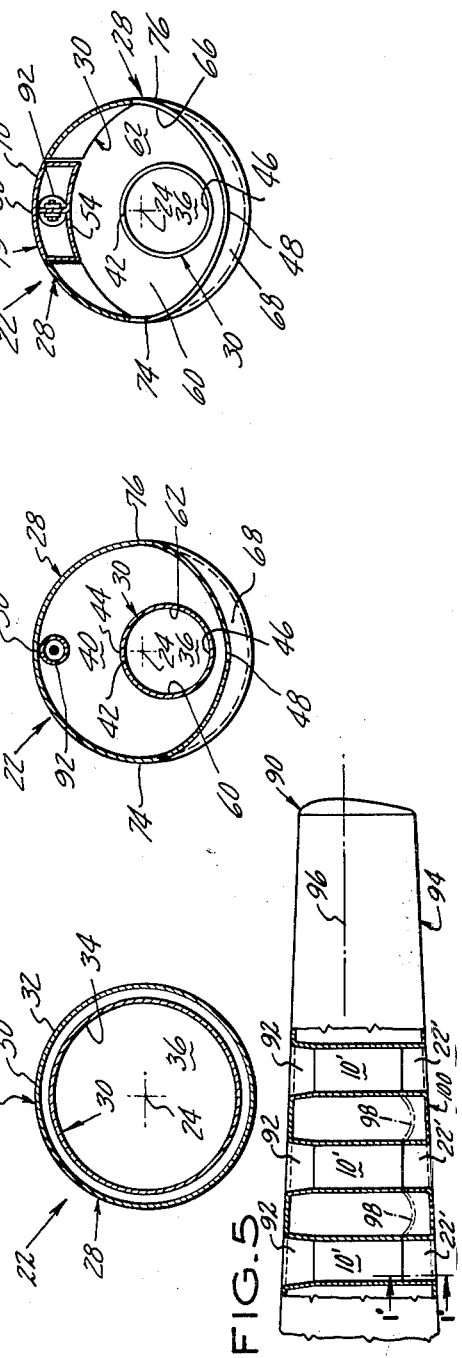
INVENTOR
WILLIAM H. SENS
BY Vernon F. Hauschild
ATTORNEY

United States Patent Office 3,019,601
Patented Feb. 6, 1962

3,019,601
PEN-SHAPED NOZZLE WITH THRUST DEFLECTOR
William H. Sens, Elmwood, Conn., assignor to United Aircraft Corporation, East Hartford, Conn., a corporation of Delaware
Filed Oct. 5, 1959, Ser. No. 844,328
9 Claims. (Cl. 60—35.55)

This invention relates to exhaust nozzles having good high speed and low speed performance characteristics and more particularly to exhaust nozzles which are pen-shaped or shark nose-shaped and have provisions for jet deflection.

It is an object of this invention to teach an exhaust nozzle having good flight characteristics at both high and low speeds and which has provisions for deflecting the jet of exhaust gas being discharged therefrom to atmosphere for thrust generating purposes downwardly during take-off and certain flight maneuvers to generate lift and hence shorten the required take-off distance.

It is a further object of this invention to teach an exhaust nozzle having jet deflection means which form part of the normal thrust generating exhaust nozzle when in its retracted position and which causes the exhaust gas to be directed downwardly during take-off and certain flight operations.

It is a further object of this invention to teach such a jet deflector which not only is a part of the exhaust nozzle per se, but which is also actuatable by actuating means fully enveloped within the exhaust nozzle structure, which is failsafe should the actuating means become inoperative because exhaust gas loading will return the jet deflection mechanism to its normal operating position.

It is a further object of this invention to teach an exhaust nozzle having a jet deflecting flap forming an integral part thereof, and which flap may be free-floating and operated solely by the pressure of the exhaust gas being discharged from the engine.

It is a further object of this invention to teach an exhaust nozzle which does not use a tailcone but provides a substitute expansion surface which may be cooled by passing cooling air in close proximity thereto.

Other objects and advantages will be apparent from the specification and claims and from the accompanying drawings which illustrate an embodiment of the invention.

FIG. 1 is an exterior showing of a typical flight vehicle utilizing my exhaust nozzle, broken away in part to illustrate the exhaust nozzle construction.

FIGS. 2, 3 and 4 are cross-sectional views taken along lines 2—2, 3—3 and 4—4 of FIG. 1, respectively.

FIG. 5 represents an alternate embodiment of my exhaust nozzle.

My exhaust nozzle will be described herein in conjunction with a turbojet engine with an afterburner, but it should be borne in mind that it is equally applicable to any type of flight vehicle which generates thrust by discharging fluid, such as exhaust gases, to atmosphere.

Referring to FIG. 1 we see turbojet engine 10, which is of the type more fully described in U.S. Patent Nos. 2,711,631 and 2,747,367, and which has an afterburner of the type taught in U.S. Patent No. 2,863,282. Engine 10 comprises air inlet section 12, compressor 14, burner section 16, turbine section 18 and afterburner 20, together with my exhaust nozzle 22. Air enters air inlet 12 and is compressed in passing through compressor 14, has energy imparted thereto due to the heat generated in burner section 16, has energy extracted therefrom in passing through turbine 18, which extracted energy is used to drive compressor 14, is reheated in passing through afterburner 20, and is eventually discharged to atmosphere through my exhaust nozzle 22 as a column of high temperature, high pressure and high velocity exhaust gas which acts to generate thrust. Engine 10 is of substantially circular cross section and concentric about longitudinal axis 24.

My exhaust nozzle 22 comprises a casing 26 which may be either solid or hollow and which includes outer surface 28 and inner surface 30 which coact to form exhaust nozzle 22 to be pen-shaped or shark nose-shaped. The forward end 32 of outer surface 28 and the forward end 34 of inner surface 30 are of generally circular cross section and concentric about longitudinal axis 24 of both engine 10 and exhaust nozzle 22 so that the exhaust gas passage 36, defined by inner surface 30, is substantially cylindrical and concentric about longitudinal axis 24 in the area defined by forward ends 32 and 34. As used herein, the term "substantially circular" will mean not only shapes which are precisely circular but which are of related shapes such as oval or elliptical. Exhaust gas passage 36 converges downstream of front ends 32 and 34 to define a tipped, minimum diameter throat 38 at the middle portion 40 of casing 26. The top inner surface 42 of central portion 40 converges toward axis 24 to define a point or region of minimum distance from axis 24 at point or region 44. The bottom surface 46 of middle portion 40 converges smoothly toward axis 24 and terminates at its rearward end 48 a distance rearward or downstream of point 44 so that the minimum area exhaust nozzle throat 38, defined between rearward end 48 and minimum distance region or point 44, is tipped with respect to axis 24 and defines an acute angle "a" with top straight portion 50 of casing outer surface 28. The after or rearward end 52 of inner surface 30 diverges away from axis 24 smoothly and terminates in inner surface point portion 54. Inner surface 30 also includes connecting portions 60 and 62 which smoothly join the convergent top inner surface 42 to the convergent bottom inner surface 46 and which connecting portions also smoothly join inner surface bottom rearward end 48 with tip 64 of tip portion 54 of inner surface rearward or after end 52. In view of this construction, inner surface 30 defines gas passage 36 which is substantially circular in cross section and concentric about axis 24 at its forward end, substantially circular in cross section and eccentric below axis 24 at its middle portion and then defining a divergent gas expansion surface terminating in exhaust gas outlet 66 which is pen-shaped or shark nose-shaped at its after end and through which the exhaust gases from engine 10 are discharged to atmosphere to generate thrust. Outer surface 28 has straight surface 50 on its top side which is spaced from but parallel to axis 24 and extends the full length of exhaust nozzle 22. Outer surface 28 also has bottom surface 68 at its middle portion 40 which is shaped to smoothly converge longitudinally toward axis 24 to terminate in common after or rearward end 48 with bottom inner surface 46 and cooperate therewith to define substantially pointed boattail 70. The convergence of surfaces 68 is of greater angularity than either the convergence of surface 46 or the divergence of surface 52. It will be noted that point 48 is positioned rearward or downsream of point 44 and a substantial distance forward or upstream of point 64. The central portion 40 of outer surface 28 also includes connecting portions 74 and 76 which smoothly join bottom surface 68 to top surface 50 as best shown in FIG. 3. At its after, rearward or downstream end, outer surface 28 terminates in point portion 78 which has a common rearward end with inner surface point portion 54 at point 64 and, as best shown in FIG. 4, the connecting portions 74 and 76 of outer surface 28 smoothly join point 48 and point 64 so that outer surface 28 and inner surface 30 coact to define thin-mouthed exhaust gas outlet 66 which, due to its thinness and substantial pointed cross-sectional shape throughout its periphery, permits minimum drag. Inner point portion 54 and outer point portion 78 coact to define nozzle point portion 79.

It will be noted that at central portion 40 of exhaust nozzle 22, outer surface 28 and inner surface 30 are spaced from one another to define a chamber 80 therebetween.

The pen-shaped or shark nose-shaped exhaust nozzle 22 just described has good operating characteristics at low or subsonic speed because the coaction of tilted throat 38 and the greater angularity of surface 68 to surface 52 causes the exhaust gases which are discharged through throat 38 to flow against and hence expand against expansion surface 52 which extends between points 44 and 46. The air which flows along surface 68 will be free stream air and, due to the angularity of surface 68, will tend to force or hold the exhaust gases against surface 52.

Exhaust nozzle 22 has good high speed or supersonic operating characteristics since the coaction of tipped throat 38 and the expansion waves which are generated from point 48 will cause the exhaust gases passing through throat 38 to expand against divergent surface 52. Accordingly, this exhaust gas expansion against surface 52 will provide lift during at least a portion of the operation of engine 10.

During take-off operation, it is desirable to obtain as much lift as possible to permit take-off in the shortest runway distance and accordingly nozzle point portion 79, is pivotally attached by pivot means 90 to casing 26 and actuated by actuating means 92 which is completely contained within cavity 80, and which well may be of the conventional piston-cylinder type actuated by air from compressor 14 which is selectively provided in known fashion to opposite sides thereof. Point portion 79, by the action of mechanism 92, may be pivoted between a first position shown in solid lines in FIG. 1 wherein it forms the after end of nozzle 22 and after portions of straight surface 50 as well as expansion surface 52 and an inner position which is convergent with respect to axis 24, as shown in phantom in FIG. 1, so that it presents inner point portion 54' as a surface to deflect the exhaust gas being discharged through throat 38 and outlet 66 downwardly. When in its phantom FIG. 1 position, point portion 79 generates lift by deflecting the exhaust gas flow downwards.

It will be obvious to those skilled in the art that the passage of slip stream air over outer surface 28 of my exhaust nozzle 22 will serve to cool the parts thereof.

It will be noted that the shape and pivotal connection of point portion 79 is such that the exhaust gases expanding thereagainst tend to return the point portion 79 to its normally operative solid line FIG. 1 position so that my exhaust nozzle is failsafe in operation should actuating means 92 fail to return the point portions. In fact, beneficial thrust would be obtained under some conditions by permitting point portion 79 to float freely and assume the angle dictated by the pressure of exhaust gases being discharged through throat 38 along surface 52 and by the external airflow along surface 78.

As best shown in FIG. 4, it may be desirable to cause point portion 79 to terminate laterally along lines 98 and 100.

It will be obvious to those skilled in the art that while exhaust nozzle 22 is preferably of circular cross section when used as a single engine installation as in FIG. 1, it may be desirable to mount a plurality of engines 10' (FIG. 5) in an aircraft wing 90, for example, to receive air through inlets 92 and discharge their exhaust gases to atmosphere through a plurality of exhaust nozzles 22' which are located in and may be formed by trailing edge 94 of wing 90. Exhaust nozzles 22' may be of generally rectangular cross section elongated in the direction of axis 96 of wing 90. It may be preferable to join the plurality of exhaust nozzles 22 through connecting structure 98 so that engines 10' are all discharging to atmosphere through a common elongated and horizontally extending slot-shaped exhaust nozzle 100. Both exhaust nozzles 22' and 100 will be of the cross-sectional shape illustrated for exhaust nozzle 22 in FIG. 1 when a cross-sectional line is struck through lines 1—1 of FIG. 9. It will be obvious to those skilled in the art that noncircular exhaust nozzles 22' and 100 are within the scope of my exhaust nozzle teaching.

It is to be understood that the invention is not limited to the specific embodiment herein illustrated and described but may be used in other ways without departure from its spirit as defined by the following claims.

I claim:

1. A pen-shaped exhaust nozzle having a casing with an outer and inner surface, said outer surface being substantially straight on the top thereof and extending for the full exhaust nozzle length and terminating in a point, and further having a smoothly curved surface on the bottom thereof converging gradually toward said straight portion and terminating at its rearward end substantially short thereof and still further having connecting portions smoothly joining said straight and smoothly curved surfaces so that said casing outer surface is pen-shaped, said casing having an inner surface defining an exhaust gas passage communicating with atmosphere and shaped to define a passage of substantially circular cross section at its forward end, and also having a tipped nozzle throat extending from said rearward end of said curved outer surface toward said straight outer surface in a direction to define an acute angle therewith from the point end thereof, and still further having an expansion surface rearward of said throat and converging toward said straight outer surface and terminating at said point, and means to change the position of said casing adjacent said point to deflect exhaust gases passing through the exhaust nozzle downwardly.

2. A pen-shaped exhaust nozzle having a casing with an outer and inner surface, said outer surface being substantially straight on the top thereof and extending for the full exhaust nozzle length and terminating in a point portion, and further having a smoothly curved surface on the bottom thereof converging gradually toward said straight portion and terminating at its rearward end substantially short thereof and still further having connecting portions smoothly joining said straight and smoothly curved surfaces so that said casing outer surface is pen-shaped, said casing having an inner surface defining an exhaust gas passage communicating with atmosphere and shaped to define a passage of substantially circular cross section at is forward end, and further having an expansion surface rearward of said throat and converging toward said straight outer surface and terminating at said point portion, and also having a minimum cross-sectional area nozzle throat smoothly joining said forward end and said expansion surface, said throat extending from said curved outer surface rearward end and being tipped toward said expansion surface, said point portion being pivotally attached to the remainder of said casing, and means to pivot said point portion downwardly to present a flow directing and lift generating surface to the exhaust gases being discharged through said exhaust nozzle.

3. A shark nose-shaped nozzle having a longitudinal axis and comprising gas passage defining means through which exhaust gases flow to atmosphere, said gas passage defining means being so shaped at its forward end to define a gas passage of circular cross section concentric about said axis and further being so shaped to then converge to define a nozzle throat of substantially circular cross section but eccentric to and tipped with respect to said axis, and still further being so shaped to terminate in a point portion at its rearward end and to define a smooth surface diverging in the direction of throat tipping and joining said throat and said point portion to define a shark nose-shaped exhaust gas outlet, said nose portion being pivotally attached to the remainder of said gas passage defining means and being pivotable toward said axis to define an exhaust gas turning and lift generating surface.

4. A shark nose-shaped nozzle having a longitudinal axis and comprising gas passage defining means and having an outer surface over which cooling air is passed and an inner surface defining a gas passage through which exhaust gases flow, said outer surface being substantially circular in cross section and concentric about said axis at its forward end and also having a straight top surface spaced from and parallel to said axis and terminating at its rearward end in a point portion and further having a bottom portion curved longitudinally toward said axis and terminating in a rearward end substantially forward of said point portion and further having connecting portions smoothly joining said bottom portion rearward end and said point portion, said inner surface being substantially circular in cross section and concentric about said axis at its forward end then converging into a middle portion to define the nozzle throat, the top inner surface at said middle portion converging toward said axis to a region of minimum distance from said axis and being spaced from said outer surface to define a chamber therebetween, the bottom inner surface of said middle portion being spaced from and converging with and toward said outer surface bottom portion at its rearward end to define a boattail structure which is pointed in cross section and convergent toward said axis and terminating at said outer surface bottom portion after end a substantial distance forward of said outer surface point portion and rearward of said minimum distance region to define a nozzle throat therebetween which is eccentric to and tipped toward said axis and extending in a direction to define an acute angle with said outer surface straight top surface when viewed from said outer surface point portion, said inner surface middle portion further having connecting portions smoothly joining said middle portion top and bottom surfaces, said inner surface further having a rearward end terminating in a point portion and which smoothly diverges from said axis while joining said throat and said outer surface point portion and which smoothly blends and cooperates with said outer surface to define an exhaust outlet of shark-nose shape, said point portions being pivotable between a first position wherein said inner surface point portion defines a part of said divergent surface and a second position wherein its inner surface point portion diverges toward said axis to present an exhaust gas flow direction changing and lift generating surface.

5. Apparatus according to claim 4 including means to actuate said point portion located in said chamber.

6. Apparatus according to claim 4 including means to pass exhaust gas through said exhaust gas passage and wherein said point portions are free floating.

7. Apparatus according to claim 4 wherein the angularity of said convergent outer surface bottom portion adjacent said rearward end thereof is greater than the angularity of said divergent inner surface rearward end so that free stream air passed over said convergent outer surface bottom portion will cause exhaust gases to expand against said divergent inner surface rearward end.

8. An exhaust nozzle having an axis and a casing with an outer surface and an inner surface defining an elongated exhaust outlet extending transversely of said axis, said outer and inner surfaces having top and bottom portions, said outer surface top portion being substantially straight, spaced from and parallel to said axis and extending for the full exhaust nozzle length and terminating in an after end, said outer surface bottom portion being shaped to curve smoothly and converging gradually toward said outer surface top portion and terminating at its rearward end substantially short of said straight outer surface top portion after end, said casing inner surface defining an exhaust gas passage communicating with atmosphere and shaped to define an elongated exhaust outlet extending transversely of said axis, said inner surface top portion having a smooth wall at its forward end diverging rearwardly from said outer surface top portion and a smooth wall at its after end forming a point with said outer surface top portion after end and diverging forwardly from said outer surface top portion to join said forward end wall at a point maximum distance from said outer surface top portion and spaced forward of said outer surface bottom portion rearward end to define a tipped nozzle throat extending from said rearward end of said curved outer surface bottom portion toward said straight outer surface top portion in a direction to define an acute angle therewith from said after end thereof, and actuating means enveloped between said inner and outer surfaces to change the position of said casing adjacent said after end to deflect exhaust gases passing through the exhaust nozzle.

9. An exhaust nozzle of pen-shaped cross section having an axis and a casing with an outer and inner surface, said outer surface being substantially straight on the top thereof and extending for the full exhaust nozzle length and terminating at its rearward end in a line transverse to and above said axis, and further having a smoothly curved surface on the bottom thereof converging gradually toward said axis and straight portion and terminating at its rearward end substantially short thereof and still further having connecting portions smoothly joining said straight and smoothly curved surfaces, said casing having an inner surface defining an exhaust gas passage communicating with atmosphere, said inner surface having a bottom surface converging smoothly toward said axis and joining said outer surface curved bottom surface at its rearward end to define the point closest to and below said axis, said inner surface also having a top surface which converges toward said axis at its forward end to define the points closest to and above said axis and which point is located forward of said closest point below said axis to define a tipped nozzle throat therewith which throat defines an acute angle with said straight outer surface when viewed from the rearward end thereof, and still further having an expansion surface rearward of said throat and converging toward said straight outer surface and terminating along said transverse line to cooperate with said straight outer surface to define a point in cross-section, and means enveloped within said casing to change the position of said casing adjacent said cross-sectional point to deflect exhaust gases passing through the exhaust nozzle downwardly.

References Cited in the file of this patent
UNITED STATES PATENTS

| 2,657,575 | Allen | Nov. 3, 1953 |
| 2,683,962 | Griffith | July 20, 1954 |
| 2,734,698 | Straayer | Feb. 14, 1956 |
| 2,758,805 | Graham | Aug. 14, 1956 |
| 2,866,610 | Taylor | Dec. 30, 1958 |
| 2,944,765 | Lane et al. | July 12, 1960 |
| 2,951,660 | Giliberty | Sept. 6, 1960 |
| 2,956,759 | Creasey et al. | Oct. 18, 1960 |